US012639123B2

(12) United States Patent
Golkhou et al.

(10) Patent No.: US 12,639,123 B2
(45) Date of Patent: May 26, 2026

(54) SYSTEMS AND METHODS FOR DYNAMIC ESTIMATION OF TIME-TO-COMPLETION

(71) Applicant: JPMORGAN CHASE BANK, N.A., New York, NY (US)

(72) Inventors: Vahid Golkhou, Seattle, WA (US); Loryfel Nunez, New York, NY (US); Samantha Zucker, Hoboken, NJ (US); Anirban Roy, Wilmington, DE (US); Rebecca E. Lavault, Clayton, DE (US); Harsh Patel, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 531 days.

(21) Appl. No.: 18/334,845

(22) Filed: Jun. 14, 2023

(65) Prior Publication Data

US 2024/0419499 A1 Dec. 19, 2024

(51) Int. Cl.
*G06F 9/50* (2006.01)
*G06N 5/022* (2023.01)

(52) U.S. Cl.
CPC .......... *G06F 9/5038* (2013.01); *G06N 5/022* (2013.01)

(58) Field of Classification Search
CPC ................................................... G06F 9/5038

USPC .......................................................... 718/104
See application file for complete search history.

(56) References Cited

U.S. PATENT DOCUMENTS

| | | | |
|---|---|---|---|
| 2004/0054998 A1* | 3/2004 | Hayashi | G06F 9/4887 718/102 |
| 2012/0054763 A1* | 3/2012 | Srinivasan | G06F 9/5077 718/104 |
| 2024/0142263 A1* | 5/2024 | Gottin | G01C 21/3841 |

* cited by examiner

*Primary Examiner* — Charlie Sun
(74) *Attorney, Agent, or Firm* — GREENBERG TRAURIG LLP

(57) ABSTRACT

A method for dynamic estimation of time-to-completion may include: receiving historical ticket data for historical tickets, the historical ticket data comprising historical tasks for each historical ticket; assigning each of the historical tasks into one of a plurality of buckets based on a common feature; training, for each bucket, a trained machine learning engine to predict a time-to-completion for the tasks in the bucket; receiving a current ticket; determining a plurality of tasks and an order of executing the tasks for the current ticket; identifying one of the buckets for each of the tasks in the current ticket; predicting, for each task in the current ticket, the time-to-completion for the current using the trained machine learning engine for the bucket for the task; combining the time-to-completion for the tasks for the current ticket into a current ticket time-to-completion; and returning the current ticket time-to-completion for the current ticket.

17 Claims, 5 Drawing Sheets

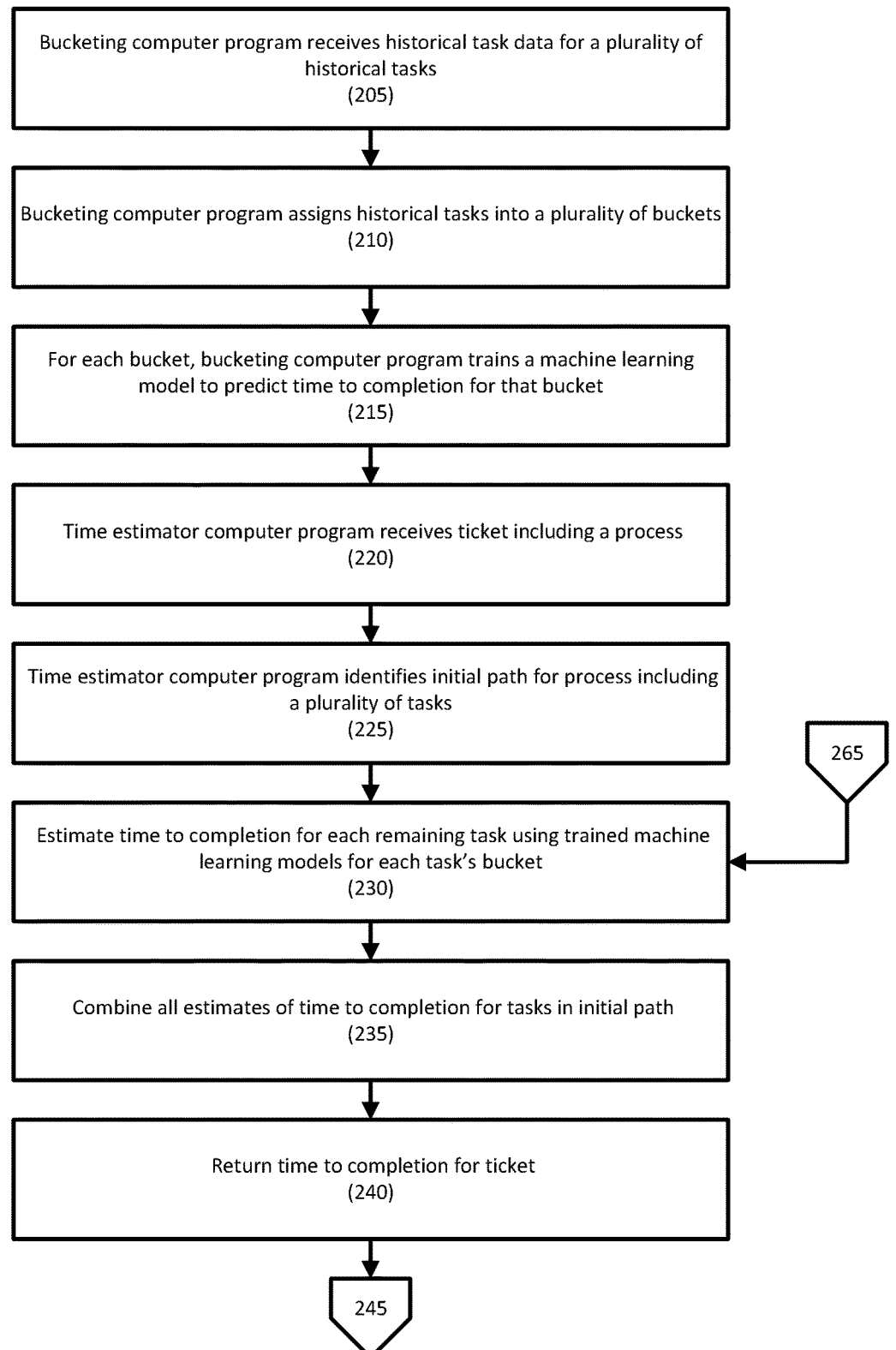

Bucketing computer program receives historical task data for a plurality of historical tasks
(205)

Bucketing computer program assigns historical tasks into a plurality of buckets
(210)

For each bucket, bucketing computer program trains a machine learning model to predict time to completion for that bucket
(215)

Time estimator computer program receives ticket including a process
(220)

Time estimator computer program identifies initial path for process including a plurality of tasks
(225)

265

Estimate time to completion for each remaining task using trained machine learning models for each task's bucket
(230)

Combine all estimates of time to completion for tasks in initial path
(235)

Return time to completion for ticket
(240)

SYSTEMS AND METHODS FOR DYNAMIC ESTIMATION OF TIME-TO-COMPLETION

BACKGROUND OF THE INVENTION

1. Field of the Invention

Embodiments relate generally to systems and methods for dynamic estimation of time-to-completion.

2. Description of the Related Art

Before a multi-task workflow starts, it is desirable to know how long it will take for the multi-task workflow to complete for planning and efficiency proposes. There is generally, however, low visibility with the status of the systems that perform the tasks as the workflow progresses through its tasks.

SUMMARY OF THE INVENTION

Systems and methods for dynamic estimation of time-to-completion are disclosed. According to an embodiment, a method for dynamic estimation of time-to-completion may include: (1) receiving, at a bucketing computer program executed by an electronic device, historical ticket data for a plurality of historical tickets, the historical ticket data comprising a plurality of historical tasks for each historical ticket; (2) assigning, by the bucketing computer program, each of the historical tasks into one of a plurality of buckets, wherein each of the buckets groups the assigned tasks based on a common feature; (3) training, by the bucketing computer program, and for each bucket, a trained machine learning engine to predict a time-to-completion for the plurality of tasks in the bucket; (4) receiving, by a time estimator computer program executed by the electronic device and from a client computer program, a current ticket; (5) determining, by the time estimator computer program, a plurality of tasks and an order of executing the tasks for the current ticket; (6) identifying, by the time estimator computer program, one of the plurality of buckets for each of the tasks in the current ticket; (7) predicting, by the time estimator computer program and for each task in the current ticket, the time-to-completion for the current using the trained machine learning engine for the bucket for the task; (8) combining, by the time estimator computer program, the time-to-completion for the plurality of tasks for the current ticket into a current ticket time-to-completion; and (9) returning, by the time estimator computer program, the current ticket time-to-completion for the current ticket.

In one embodiment, the historical ticket data may also include an order of execution for the historical ticket tasks.

In one embodiment, the historical ticket data may also include a position of each historical task in the order of execution.

In one embodiment, the common feature may include a percentile of the time-to-completion.

In one embodiment, the method may also include applying, by the bucketing computer program, a bucket modeling prioritization strategy, wherein the plurality of buckets are ordered based on a priority.

In one embodiment, the priority may be based on a number of workflows having their key tasks within the bucket.

In one embodiment, the method may also include: determining, by the time estimator computer program, that the current ticket time-to-completion breaches a service level agreement; and adding additional resources to execute the tasks in the current ticket.

In one embodiment, the method may also include re-training, by the bucketing computer program, one or more of the trained machine learning engines using time-to-completions for competed tasks in the current ticket.

According to another embodiment, a system may include: a client computer executing a client computer program; a source of historical ticket data for a plurality of historical tickets, the historical ticket data comprising a plurality of historical tasks for each historical ticket; and an electronic device executing a bucketing computer program that receives the historical ticket data for a plurality of historical tickets, assigns each of the historical tasks into one of a plurality of buckets, wherein each of the buckets groups the assigned tasks based on a common feature, and, for each bucket, trains a machine learning engine to predict a time-to-completion for the plurality of tasks in the bucket; and a time estimator computer program that receives a current ticket from the client computer program, a current ticket, determines a plurality of tasks and an order of executing the tasks for the current ticket, identifies one of the plurality of buckets for each of the tasks in the current ticket, predicts, for each task in the current ticket, the time-to-completion for the current using the trained machine learning engine for the bucket for the task, combines the time-to-completion for the plurality of tasks for the current ticket into a current ticket time-to-completion, and returns the current ticket time-to-completion for the current ticket.

In one embodiment, the historical ticket data may also include an order of execution for the historical ticket tasks.

In one embodiment, the historical ticket data may also include a position of each historical task in the order of execution.

In one embodiment, the common feature may include a percentile of the time-to-completion.

In one embodiment, the bucketing computer program may apply a bucket modeling prioritization strategy to order the plurality of buckets based on a priority.

In one embodiment, the priority may be based on a number of workflows having their key tasks within the bucket.

In one embodiment, the time estimator computer program may determine that the current ticket time-to-completion breaches a service level agreement and may add additional resources to execute the tasks in the current ticket.

In one embodiment, the bucketing computer program may re-train one or more of the trained machine learning engines using time-to-completions for competed tasks in the current ticket.

According to another embodiment, a non-transitory computer readable storage medium, may include instructions stored thereon, which when read and executed by one or more computer processors, cause the one or more computer processors to perform steps comprising: receiving historical ticket data for a plurality of historical tickets, the historical ticket data comprising a plurality of historical tasks for each historical ticket, an order of execution for the historical ticket tasks, and a position of each historical task in the order of execution; assigning each of the historical tasks into one of a plurality of buckets, wherein each of the buckets groups the assigned tasks based on a common feature, wherein the common feature comprises a percentile of the time-to-completion; training, for each bucket, a trained machine learning engine to predict a time-to-completion for the plurality of tasks in the bucket; receiving, from a client computer program, a current ticket; determining a plurality of tasks and an order of executing the tasks for the current ticket; identifying one of the plurality of buckets for each of the tasks in the current ticket; predicting, for each task in the current ticket, the time-to-completion for the current using the trained machine learning engine for the bucket for the task; combining the time-to-completion for the plurality of tasks for the current ticket into a current ticket time-to-completion; and returning the current ticket time-to-completion for the current ticket.

In one embodiment, the non-transitory computer readable storage medium may also include instructions stored thereon, which when read and executed by one or more computer processors, cause the one or more computer processors to apply a bucket modeling prioritization strategy, wherein the plurality of buckets are ordered based on a priority, wherein the priority is based on a number of workflows having their key tasks within the bucket.

In one embodiment, the non-transitory computer readable storage medium may also include instructions stored thereon, which when read and executed by one or more computer processors, cause the one or more computer processors to determine that the current ticket time-to-completion breaches a service level agreement and to add additional resources to execute the tasks in the current ticket.

In one embodiment, the non-transitory computer readable storage medium may also include instructions stored thereon, which when read and executed by one or more computer processors, cause the one or more computer processors to re-train one or more of the trained machine learning engines using time-to-completions for competed tasks in the current ticket.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIGS. 2A and 2B depict a method for dynamic estimation of time-to-completion according to an embodiment.

DETAILED DESCRIPTION OF PREFERRED EMBODIMENTS

Embodiments relate generally to systems and methods for dynamic estimation of time-to-completion.

Embodiments may handle a plurality of distinct processes (e.g., in a financial institution, account maintenance, money transfer, fees, client request, trust, etc.), with each process having multiple different tasks (e.g., initiate request, callback, ops input, ops validate, approval, booking, etc.) with various time-scales (e.g., some need seconds, minutes, or hours to complete others days, weeks, or months). Embodiments may provide a modular framework for implementing the architecture.

Embodiments may include an intelligent task decomposition strategy whereby bucketing similar tasks or common-components based on their properties and time-scale completion. Embodiments may implement a regression algorithm based on density-distribution across multiple key properties using an ensemble of statistical and machine learning techniques and topological data analysis. Embodiments may also use a path-finder algorithm to guide the above machine learning models with specific tasks each ticket has to go through.

Embodiments may provide a scalable system and method that can cover workflows of any size, such as tens, hundreds, or thousands of workflows.

Embodiments may provide a robust system and method that provide estimates for a time-to-completion regardless of the amount of available information or whether that information was seen during the training phase.

Embodiments may provide dynamic adaptability. For example, as each ticket progresses toward completion and more information becomes available for the estimation of time-to-completion, embodiments may provide increasingly accurate estimates.

Embodiments may provide continuous learning and improvement. For example, as new tickets are estimated and subsequently completed, their actual time-to-completions may be added to the training dataset in real-time. This enhances the efficiency of the model and eliminates data drift in subsequent estimation batches.

Embodiments may provide at least some of the following technical advantages. For example, embodiments provide a framework that simultaneously addresses various issues and problems that each would be a very hard problem to tackle such as: the structural complexity and non-homogeneity of the problem space (e.g., workflows); the dimensionality of the project with low level of useable information/features, and the sheer volume of tasks or tickets; scalability of the framework that can be expanded across non-homogenous regions; robustness of algorithm and the ability to generate a time-to-completion estimate for multiple scenarios; modularity and adaptability to address "data drift"; etc.

Figure 1:
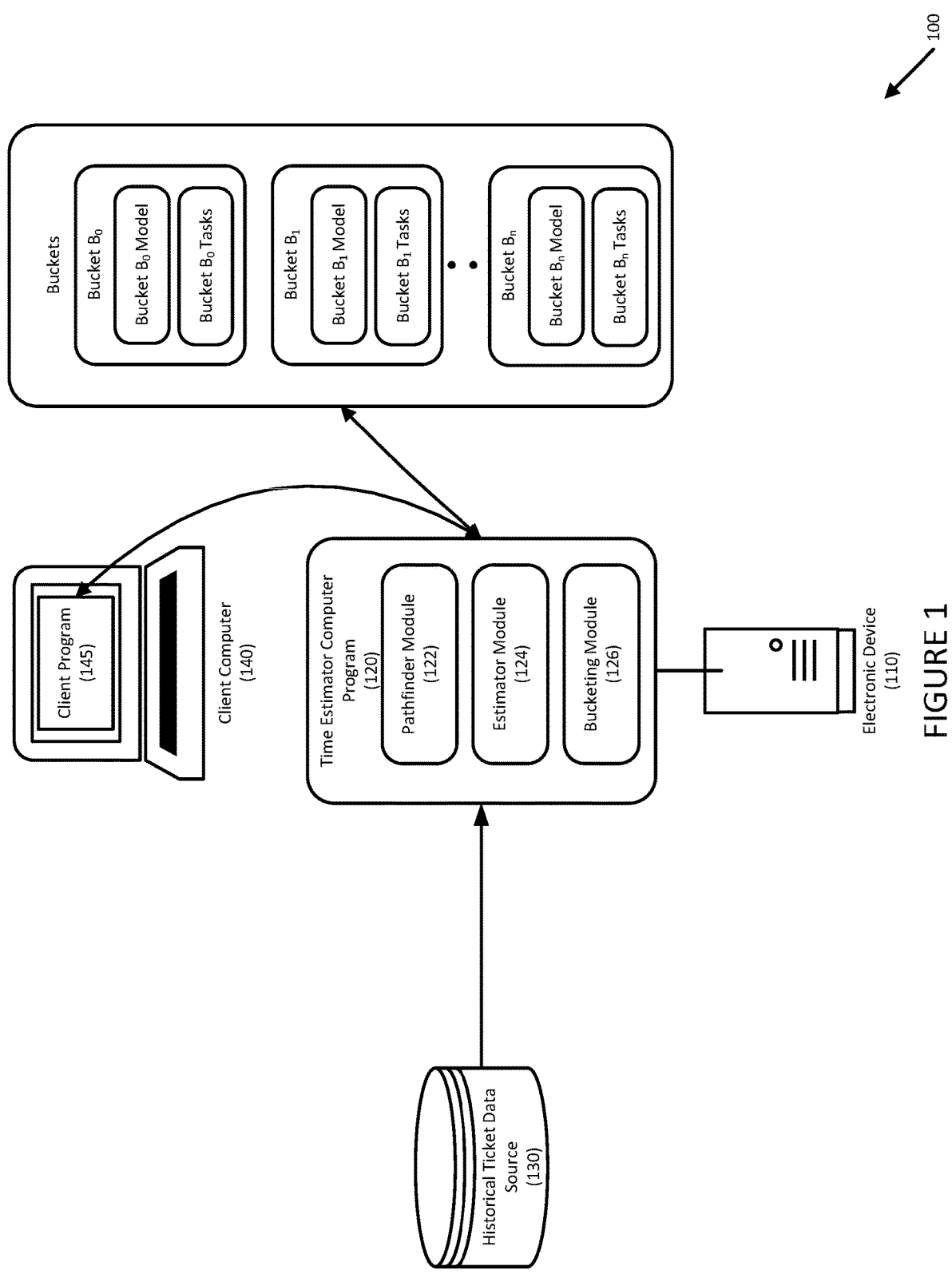
FIG. 1 depicts a system for dynamic estimation of time-to-completion according to an embodiment.

Referring to FIG. 1, a system for dynamic estimation of time-to-completion is disclosed according to an embodiment. System 100 may include electronic device 110, which may be any suitable electronic device, including servers, computers (e.g., workstations, desktops, laptops, notebook, tablets, etc.), smart devices (e.g., smart phones, smart watches, etc.), Internet of Things (IoT) appliances, etc. Electronic device 110 may execute time estimator computer program 120, which may include pathfinder module 122 and estimator module 124.

Pathfinder module 122 may include a trained machine learning model that may determine a likely path (i.e., an order of separate tasks) for a ticket received from client program 145. For example, pathfinder module 122 may be trained with historical ticket data from historical ticket data source 130 to predict the tasks and the order of executing those tasks.

In embodiments, pathfinder module 122 may provide the initial path (e.g., a collection or list of tasks, in order) for each of workflows. For example, the initial path, or common path, may be extracted based on an individual task's commonality factor such as the 50th percentile using the most valuable or appropriate portion of the historical data (i.e., where the attention would need to be) for each task. In embodiments, all tickets belonging to a particular workflow may have the same initial path prior to the first task initiation.

Pathfinder module 122 may also modify the initial path for a particular ticket based on the availability of new information such as conditions or new circumstances that may influence the next task occurrence. This may cause different tickets belonging to the same workflow take different paths.

Estimator module 124 may use buckets to predict an estimated time-to-completion for each of the predicted tasks.

Bucketing module 126 may receive historical ticket data from historical ticket data source 130 and may group the tasks into a plurality of buckets, $B_0$, $B_1$, $B_n$, in buckets. The number of buckets may be dynamic, may be defined by a user, etc. In one embodiment, the buckets may be based on a criteria for a task, such as an estimated time-to-completion for the task. Each bucket may be associated with a range of time-to-completions. The ranges for the buckets do not need to be uniform; for example, bucket $B_0$ may have a range of estimated time-to-completion of under 60 minutes, bucket $B_1$ may have a range of estimated time-to-completion of between 60 minutes and 8 hours, bucket $B_2$ may have a range of estimated time-to-completion of between 8 hours and 40 hours, etc.

Client computer 140 may be any suitable computer (e.g., servers, workstation, desktop, laptop, notebook, tablet, smart device, IoT device, etc.) that may execute client program 145. Client program 145 may submit tickets and may receive an estimated time for completion for the ticket from time estimator computer program 120.

Examples of client programs 145 may include client-facing programs, task management systems, client relationship manager programs, and status chat bots.

Historical ticket data source 130 may include data from past tickets. The data may include, for example, tasks for each ticket, the time-to-completion for each task, etc. Each task in the historical ticket data database may be mapped to a bucket that may be identified based on a time scale for the task.

Figure 2B:
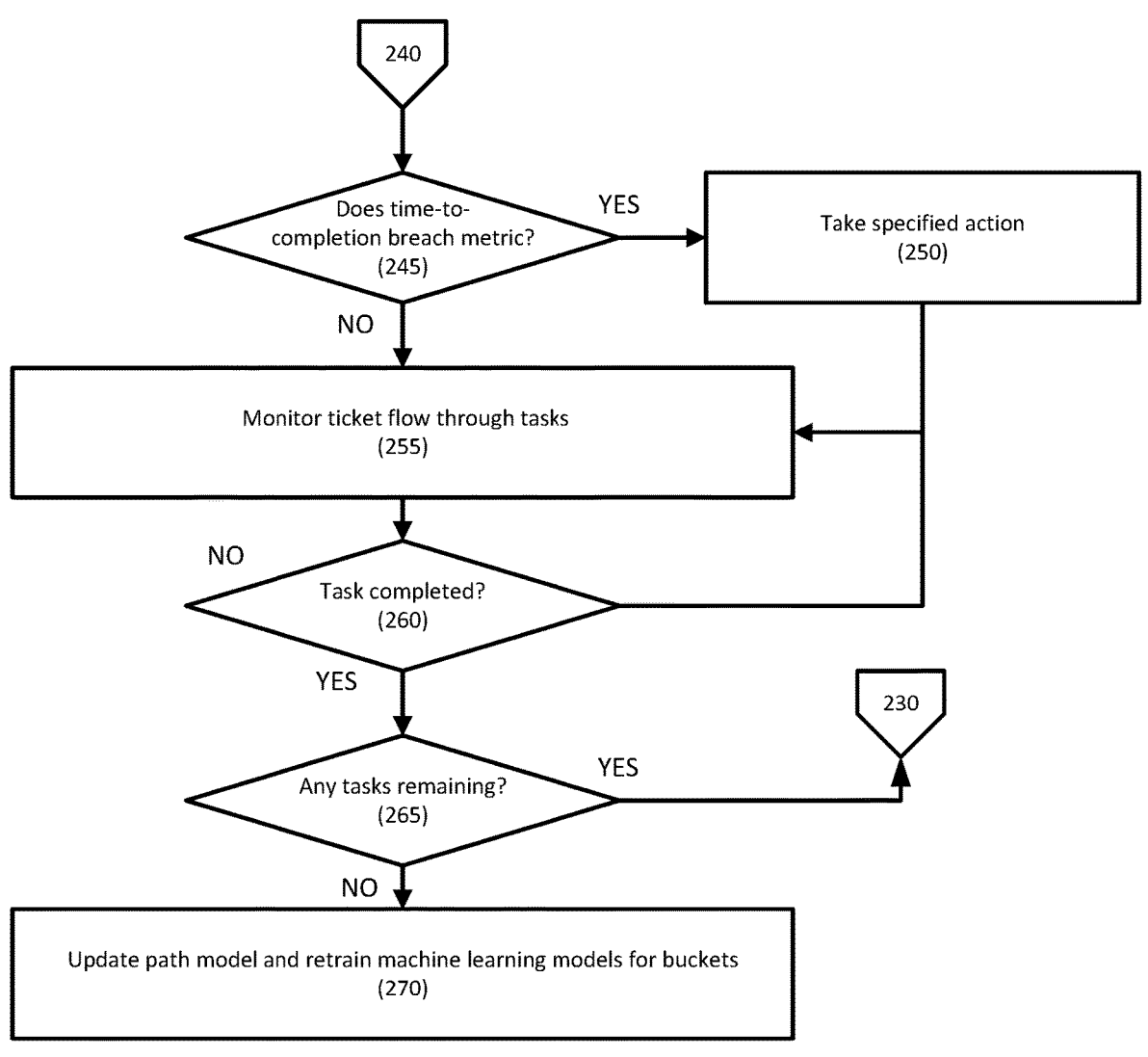

Referring to FIGS. 2A and 2B, a method dynamic estimation of time-to-completion is disclosed according to an embodiment.

In step 205, a bucketing computer program executed by an electronic device may receive historical ticket data for a plurality of historical tickets. Each ticket may be for completed process of a plurality of tasks, and the historical ticket data may identify the path or order in which the tasks were executed, the time-to-completion for each task, metadata associated with the execution of each task (e.g., workload of the task performer, the position of the task in the process, resource availability, etc.).

In step 210, the bucketing computer program may assign the historical tasks into a plurality of buckets. Each bucket may group a plurality of tasks by a common feature, such as a common time-to-completion. The number of buckets may be static, or it may be dynamic.

Figure 3:
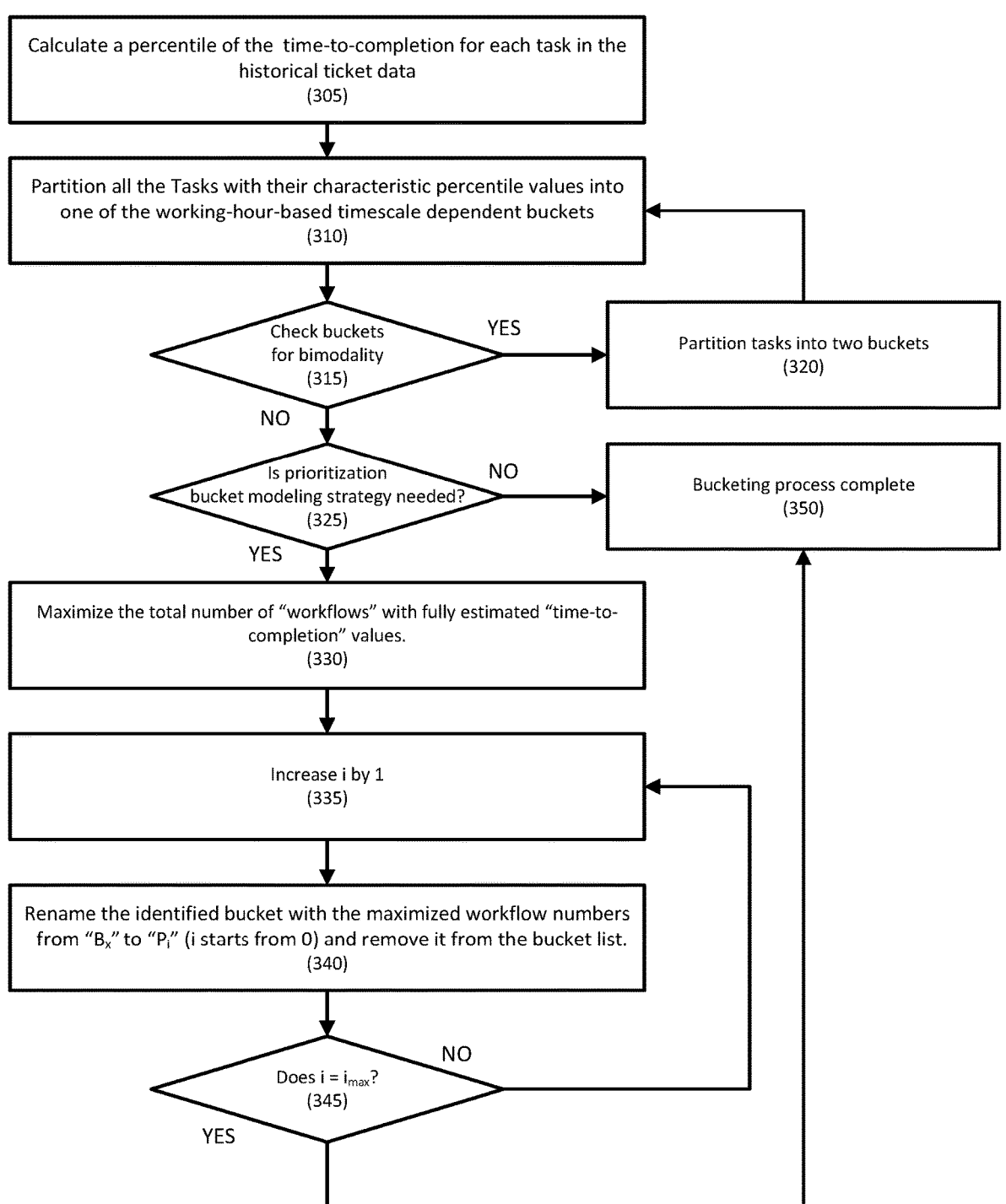
FIG. 3 depicts a bucketing process according to an embodiment.

An example of the bucketing process is provided in FIG. 3.

Referring to FIG. 3, a method for clustering tasks into buckets is provided according to an embodiment.

In step 305, using the historical ticket data, the bucketing computer program may calculate a percentile, such as a 90th percentile ("T90"), of the "time-to-completion" for each task.

In step 310, the bucketing computer program may partition all the tasks with their characteristic percentile values into one of a working-hour-based timescale dependent buckets. For example, the tasks may be grouped into buckets as follows:

| | |
|---|---|
| $B_0$: minute-order tasks | T90 < 60 minutes; |
| $B_1$: hour-order tasks | 1 hour ≤ T90 < 8 hours; |
| $B_2$: day-order tasks | 8 hours ≤ T90 < 40 hours; |
| $B_3$: week-order tasks | 40 hours ≤ T90 < 160 hours; |
| $B_4$: month-order tasks | 160 hours ≤ T90 < 1920 hours; |
| $B_5$: year-order tasks | 1920 hours ≤ T90. |

Each bucket may have a modular architecture, in which tasks may be associated with a process identifier for the task, a source of the process, a task identifier, an owning team, and a path sequence for the task. Other associations and/or different associations may be used as is necessary and/or desired, and may have a different hierarchy as is necessary and/or desired.

Note that the number of buckets (e.g., 0 to 5) and the timing range for each bucket may be configured as is necessary and/or desired.

In step 315, for each bucket, the bucketing computer program may check the distribution of the percentile value for a bimodality probability distribution, indicating that there are at least two statistical values in the bucket having the highest frequency. If there are, in step 320, the tasks in the bucket may be partitioned into two buckets and the process returns to step 310.

If the bucket is not bimodal, in step 325, the bucketing computer program may check to see if a bucket modeling prioritization strategy, such as a sequential approach, is needed. For example, due to the significant size of processes and the time required for modeling, users may opt for a sequential deployment strategy for workflows instead of releasing them all at once. This approach allows for user feedback and the integration of best practices learned from previous bucket modeling. By incorporating users' feedback, subsequent model developments and deployments can be refined and optimized, resulting in a more accurate result.

Workflows are composed of tasks that may be located across multiple buckets. In a sequential bucket modeling scenario, the estimated time to completion of a workflow cannot be determined until all corresponding tasks are modeled during the training phase. In certain cases, however, all tasks of a workflow may be located within a single bucket. When there is no hierarchy or preference in specific workflows, users may derive the most value from the bucket with the highest number of completed workflows, i.e., workflows with all required tasks modeled.

If a prioritization bucket modeling strategy is needed, in step 330, the bucketing computer program may optimize the buckets. For example, the bucketing computer program may maximize the total number of workflows with fully estimated time-to-completion values.

The highest priority bucket has the highest number of fully estimated "workflows". As an example, there are 3 buckets and 8 workflows with various number of tasks distributed among those 3 buckets. Here, T stands for "Task", W stands for "Workflow", and X represents unavailable task for a specific workflow in that particular bucket. Assuming that "Bucket 1" contains only 1 fully estimated workflow (W8), "Bucket 2" contains 3 fully estimated workflows (W1, W4, W6), and "Bucket 3" contains also only one fully estimated workflow (W2). Thus, "Bucket 2" is identified as the first as the highest priority bucket, and, after modeling "Bucket 2", "Bucket 1" and "Bucket 3" are modified.

In step 335, the bucketing computer program may increase i by 1. For example, after modeling the bucket with the highest value (P0), the same object function can be used to determine the second bucket (P1) [from P0 to P1 (i=0+1)], followed by P2 [P2: (i=1+1)], P3 [P3: (i=2+1)], and so on. After each bucket modeling completion, there may be workflows that are not fully modeled until a subsequent bucket modeling. This means that some workflows may be only partially modeled in earlier buckets and then completed in later buckets.

In step 340, the bucketing computer program may rename the identified bucket with the maximized workflow numbers from "Bx" to "Pi" (i starts from 0) and remove it from the bucket list. P0 is the bucket with the highest priority.

If, in step 345, the value i is at its maximum value, in step 350, the bucketing process may be complete. If not, the process may return to step 335.

An illustrative example of the prioritization process is as follows:

Considering the following list of buckets:

T list: [B0, B1, B2, B3, B4, B5, B6]

and the Priority (P) list: [ ] (it is empty at the beginning.)

if B3 is determined to be the bucket with the highest value, then its name is changed to P0.

Next, the T and P lists are updated:

T list: [B0, B1, B2, B4, B5, B6]

P list: [P0].

In the second trial, if it is determined that B5 is the bucket with the highest value in the new T list, then its name is changed to P1 and the T and P lists are updated:

T list: [B0, B1, B2, B4, B6]

P list: [P0, P1].

The procedure may be repeated until all the buckets in the T list transfer to the P list:

T list: [ ]

P list: [P0, P1, P2, P3, P4, P5, P6].

If no prioritization is needed, in step 350, the bucketing process may be complete.

Referring again to FIGS. 2A and 2B, in step 215, the bucketing computer program may train a machine learning engine for each of the buckets. For example, for each bucket, the bucketing computer program may train a machine learning model using metadata for the tasks in the bucket, such as the time-to-completion for each task, the workload of the task performer, the position of the task in the process, resource availability, etc., The trained machine learning model may then be used to predict a time-to-completion for the tasks in its bucket.

In step 220, a time estimator computer program may receive a current ticket to estimate the time-to-completion for. The current ticket may be received from a client computer program executed by a client device, or it may be received from a computer system as part of a larger process.

In step 225, the time estimator computer program may identify a likely path for the current ticket, including a plurality of tasks and an order of executing the tasks for the current ticket. In one embodiment, the time estimator computer program may use a pathfinder module, which may be a trained machine learning model, to predict the path.

In one embodiment, the pathfinder module may be trained with historical ticket data, and may predict the initial path from information in the current ticket. It may then modify the initial path based on new information.

To predict the initial path, the pathfinder module may decompose all of the tickets in the historical database into a plurality of tasks. A workflow can be defined as a series of steps or tasks that are required to complete a specific process or service for the customer. The workflow includes all the activities involved in the process, from the initial request or inquiry to the final resolution or outcome. The workflow may involve multiple individuals, systems, or teams within the organization, each responsible for completing a specific task or stage of the process.

In the context of a workflow, a current ticket based on unique identifier (e.g., a ticket number) may refer to a customer service request or inquiry that needs to be addressed for a specific client. This identifier may be used to track and manage the progress of the current ticket throughout its lifecycle, from creation to resolution. For example, an organization's entire operations may be defined by a set of 1000 workflows, while daily operations may generate millions of newly created tickets (or ticket numbers) for a specific workflow.). A ticket may be defined as a specific instance or representation of a workflow in action for a particular client. As a workflow comprises a collection or series of individual tasks, a ticket would inherently include some of these characteristics or tasks in its lifecycle.

The pathfinder module may create a "task database" for each of workflows in the "workflow database" based on the collection of all the available (or pre-existed) tasks in the "historical ticket database." Thus, to predict the initial path, the pathfinder module may refer to the created task database for each single workflow. Once the "task databases" are created, the pathfinder module may identify an initial path for the tickets using historical data for each workflow. For example, an appropriate portion of the historical data (e.g., the 50th percentile) may be used to identify the key tasks and their order in the initial path.

In step 230, the time estimator computer program may estimate a time-to-completion for each remaining task in the path. For example, the time estimator computer program may identify the bucket for the task, and may provide metadata associated with the task (e.g., order in the path, resource availability, etc.) to the trained machine learning model for the bucket. The trained machine learning model for the bucket may then return a predicted time-to-completion for the task.

In step 235, the time estimator computer program may combine all estimates of time-to-completion for the remaining tasks, and in step 240, may return the time-to-completion for the ticket to, for example, client-facing programs, task management systems, client relationship manager programs, and status chat bots.

If, in step 245, the time-to-completion breaches a metric (e.g., a service level agreement, the process is stalled (e.g., no time-to-completion can be returned, an invalid time-to-completion is returned, etc.), in step 250, an action may be taken. The action may include, for example, generating a notification, adding additional resources, modifying the path, etc.

In step 255, the time estimator computer program may monitor ticket flow through the tasks. If, in step 260, a task in the process is completed, in step 265, it may check to see if there are any tasks remaining. If there are, the process may return to step 230.

If, in step 260, the current task is not completed, the process may continue to monitor the tasks in step 255.

If, in step 265, there are no tasks remaining, indicating that the ticket is complete, in step 270, the time estimator computer program may update the historical ticket data with the tasks executed and the timing to completion for each task, and may use the time-to-completion data to re-train the machine learning model for the buckets.

Figure 4:
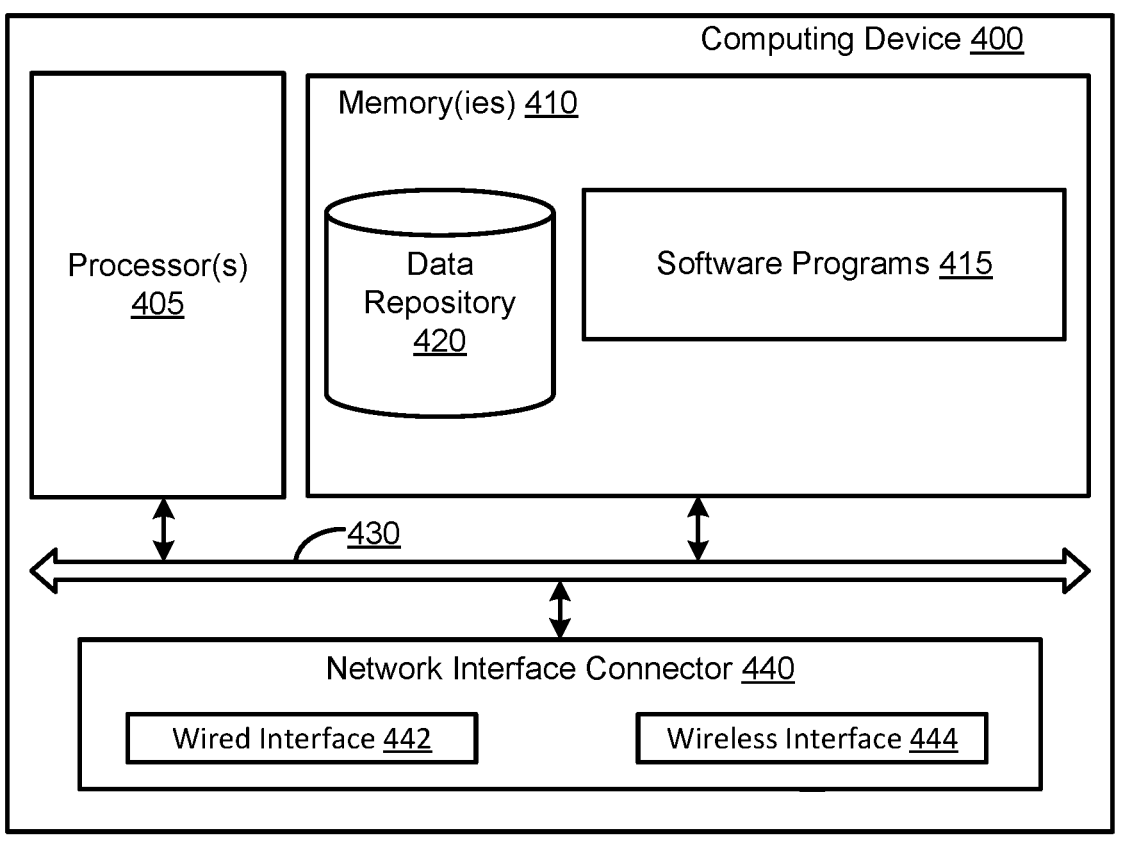
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein.

Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Although multiple embodiments have been described, it should be recognized that these embodiments are not exclusive to each other, and that features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for dynamic estimation of time-to-completion, comprising:

receiving, at a bucketing computer program executed by an electronic device, historical ticket data for a plurality of historical tickets, the historical ticket data comprising a plurality of historical tasks for each historical ticket from the plurality of historical tickets;

assigning, by the bucketing computer program, each of the historical tasks into one of a plurality of buckets, wherein each of the buckets groups the assigned tasks based on a common feature;

training, by the bucketing computer program, and for each bucket from the plurality of buckets, a machine learning engine to predict a time-to-completion for the assigned tasks in the bucket;

receiving, by a time estimator computer program executed by the electronic device and from a client computer program, a current ticket;

determining, by the time estimator computer program, a plurality of tasks from the current ticket and an order of executing the tasks for the current ticket;

identifying, by the time estimator computer program, one of the plurality of buckets for each of the tasks in the current ticket;

predicting, by the time estimator computer program and for the plurality of tasks in the current ticket, the time-to-completion for the current ticket using the trained machine learning engine for the bucket for the task;

combining, by the time estimator computer program, the time-to-completion for the plurality of tasks for the current ticket into a current ticket time-to-completion;

returning, by the time estimator computer program, the current ticket time-to-completion for the current ticket;

determining, by the time estimator computer program, that the current ticket time-to-completion breaches a service level agreement; and adding additional resources to execute the tasks in the current ticket.

2. The method of claim 1, wherein the historical ticket data further comprises an order of execution for the historical ticket tasks.

3. The method of claim 2, wherein the historical ticket data further comprises a position of each historical task in the order of execution.

4. The method of claim 1, wherein the common feature comprises a percentile of the time-to-completion.

5. The method of claim 1, further comprising:

applying, by the bucketing computer program, a bucket modeling prioritization strategy, wherein the plurality of buckets are ordered based on a priority.

6. The method of claim 5, wherein the priority is based on a number of workflows having their key tasks within the bucket.

7. The method of claim 1, further comprising:

re-training, by the bucketing computer program, one or more of the trained machine learning engines using time-to-completions for completed tasks in the current ticket.

8. A system, comprising:

a client computer executing a client computer program;

a source of historical ticket data for a plurality of historical tickets, the historical ticket data comprising a plurality of historical tasks for each historical ticket from the plurality of historical tickets; and an electronic device executing a bucketing computer program that receives the historical ticket data for a plurality of historical tickets, assigns each of the historical tasks into one of a plurality of buckets, wherein each of the buckets groups the assigned tasks based on a common feature, and, for each bucket from the plurality of buckets trains a machine learning engine to predict a time-to-completion for the assigned tasks in the bucket; and a time estimator computer program that receives a current ticket from the client computer program, a current ticket, determines a plurality of tasks from the current ticket and an order of executing the tasks for the current ticket, identifies one of the plurality of buckets for each of the tasks in the current ticket, predicts, for the plurality of tasks in the current ticket, the time-to-completion for the current ticket using the trained machine learning engine for the bucket for the task, combines the time-to-completion for the plurality of tasks for the current ticket into a current ticket time-to-completion, returns the current ticket time-to-completion for the current ticket; determines that the current ticket time-to-completion breaches a service level agreement and adds additional resources to execute the tasks in the current ticket.

9. The system of claim 8, wherein the historical ticket data further comprises an order of execution for the historical ticket tasks.

10. The system of claim 9, wherein the historical ticket data further comprises a position of each historical task in the order of execution.

11. The system of claim 8, wherein the common feature comprises a percentile of the time-to-completion.

12. The system of claim 8, wherein the bucketing computer program applies a bucket modeling prioritization strategy to order the plurality of buckets based on a priority.

13. The system of claim 12, wherein the priority is based on a number of workflows having their key tasks within the bucket.

14. The system of claim 8, wherein the bucketing computer program re-trains one or more of the trained machine learning engines using time-to-completions for completed tasks in the current ticket.

15. A non-transitory computer readable storage medium, including instructions stored thereon, which when read and executed by one or more computer processors, cause the one or more computer processors to perform steps comprising:

receiving historical ticket data for a plurality of historical tickets, the historical ticket data comprising a plurality of historical tasks for each historical ticket from the plurality of historical tickets, an order of execution for the historical ticket tasks, and a position of each historical task in the order of execution;

assigning each of the historical tasks into one of a plurality of buckets, wherein each of the buckets groups the assigned tasks based on a common feature;

training, for each bucket from the plurality of buckets, a machine learning engine to predict a time-to-completion for the assigned tasks in the bucket, wherein the common feature comprises a percentile of the time-to-completion;

receiving, from a client computer program, a current ticket;

determining a plurality of tasks from the current ticket and an order of executing the tasks for the current ticket;

identifying one of the plurality of buckets for each of the tasks in the current ticket;

predicting, for the plurality of tasks in the current ticket, the time-to-completion for the current ticket using the trained machine learning engine for the bucket for the task;

combining the time-to-completion for the plurality of tasks for the current ticket into a current ticket time-to-completion;

returning the current ticket time-to-completion for the current ticket;

determining that the current ticket time-to-completion breaches a service level agreement; and adding additional resources to execute the tasks in the current ticket.

16. The non-transitory computer readable storage medium of claim 15, further including instructions stored thereon, which when read and executed by one or more computer processors, cause the one or more computer processors to apply a bucket modeling prioritization strategy, wherein the plurality of buckets are ordered based on a priority, wherein the priority is based on a number of workflows having their key tasks within the bucket.

17. The non-transitory computer readable storage medium of claim 15, further including instructions stored thereon, which when read and executed by one or more computer processors, cause the one or more computer processors to re-train one or more of the trained machine learning engines using time-to-completions for completed tasks in the current ticket.

* * * * *